United States Patent Office 2,793,230
Patented May 21, 1957

2,793,230

PHENOXY DIHALO ALIPHATIC ACIDS

Richard G. Taylor, Olathe, Kans., assignor to The R. G. Taylor Company, Inc., Kansas City, Mo., a corporation of Kansas No Drawing. Application May 11, 1954, Serial No. 429,123

12 Claims. (Cl. 260—521)

This invention relates to novel compositions in the nature of aryl dihalo aliphatic ether acids together with their salts and esters, particularly useful as agents to alter the enzyme systems of certain molds and bacteria.

The older idea of microbiological inhibition and destruction was that of bactericidal action. The phenols and cresols were considered to be excellent bactericidal agents because of their effectiveness as protoplasmic poisons. Prior concepts of bactericidal activity have, however, been rather generally superceded by the principle of bacteriostatic activity wherein it is understood that bacteriostatic substances alter the enzyme systems, as well as the normal pattern of the enzyme sequence of the microorganisms to product inhibition to growth and reproduction of the organisms.

It is, therefore, an object of this invention to provide new biostatic agents having wide spectrums.

It may be said that the successful design of biologically active molecules involves such factors as molecular shape, stereochemical properties, and physicochemical properties such as solubility, vapor pressure and surface tension. The ether linkage provides a valency angle which lends a V shape to the molecule. The oxygen in the ether linkage, having two lone pairs of electrons, provides for polar molecules that may be hydrogen-bonded. These phenomena permit differential solubilities and partition coefficients. Such molecules may orientate themselves in such a manner as to affect either enzyme or metabolite systems. A good biostatic agent should possess these properties and it is another object of this invention to provide such chemical compositions.

It is another object of this invention to provide a biostatic agent that is not subject to protein interference and that does not tend to alter or denature proteins.

The present status of the field of microbiology is such that many commercial and/or industrial plants that process a great variety of commodities are faced with serious problems of preventing contamination of their products with microorganisms. Contamination is a loss to the producer and a danger to the consumer. These problems in microbiological engineering require new and different technique together with more efficient biostatic agents that are adaptable to this type of engineering. It is another object of this invention to provide biostatic agents that are effective and adaptable to problems in microbiological engineering.

The best criterion of an engineering process is ease of operation. Accordingly, it is an aim hereof to provide for ease of scaling, mixing, blending and applying under many and varied conditions in biostatic agents that are to be used in microbiological engineering.

It is another object of this invention to provide compositions of the above-mentioned type that are free from odors, tastes, and toxicity to man and animals.

Some examples of novel chemical compositions that are useful as biostatic agents and which have been found to fulfill the above objects, together with preferred methods of producing the same, will hereinafter be set forth, it being understood that the same are illustrative only and are not to be regarded as limitative.

Ether acids have heretofore been prepared from aliphatic carboxylic acids and their esters containing a labile halogen by treatment with either sodium alcoholates, potassium alcoholates, or barium alcoholates. It is recognized that these prior alcoholates have been prepared by reacting the alkali metals, or the metallic oxides or barium oxide, with the alcohols. Ether acids of the aryloxyaliphatic type have also been prepared by reacting the sodium salt of various phenols with the sodium salt of the halogenated aliphatic acids. Such sodium salts are normally produced by reacting both the phenol and the halo acid with an aqueous solution of sodium hydroxide and, in a similar manner, both halo aryloxyaliphatic ether acids and aryloxyhaloaliphatic ether acids are known in the art. In the first case mentioned, the mono and poly halo aryloxyaliphatic ether acids have been prepared, but in the second case only the aryl mono halo aliphatic ether acids have been reported in the literature.

I have found, however, that excellent yields of ether acids of the aryloxy dihalo aliphatic type can be presented by first refluxing alcohol with calcium oxide for a suitable time, and then adding the phenol and the trihalogenated aliphatic acid, after which addition, the mixture is stirred and refluxed a second time.

EXAMPLE I

*Phenoxy dichloroacetic acid*

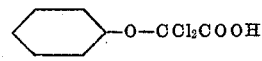

Phenol derivative: $C_8H_6O_3Cl_2$; M. W. 220.962.

|   | Theoretical | Found |
|---|---|---|
| C | 43.44 | 43.26 |
| H | 2.73 | 3.00 |
| O | 21.72 | 21.61 |
| Cl | 32.09 | 31.87 |

Boiling point 103–105° C.

4 grams of calcium oxide were added to 120 grams of ethyl alcohol which was stirred under reflux for three hours. 20 grams of phenol and 36 grams of trichloroacetic acid were added and the mixture was stirred under reflux for three hours. The excess alcohol was removed by distillation. Phenoxy dichloroacetic acid was recovered in excellent yield.

The filter paper disc method of Kolmer was used in placing this example in use, and the discs were saturated with phenoxy dichloroacetic acid. Plates of Czapeks' medium were streaked with the following organisms, the zone of inhibition being recorded with each organism. Incubation time was 96 hours at 30° C.:

| | Mm. |
|---|---|
| Rizopus nigricans | 22 |
| Mucor rouxii | 18 |
| Cephalosporium acromonum | 18 |
| Aspergillus oryzae | 22 |
| Penicillum italicum | 20 |
| Actinomyces #8 | 16 |

EXAMPLE II 2-methoxy-4-formaldo phenoxy dichloroacetic acid

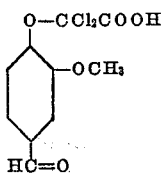

Vanillin derivative: C₁₀H₈O₅Cl₂; M. W. 278.978.

|    | Theoretical | Found |
|----|-------------|-------|
| C  | 43.01       | 42.89 |
| H  | 2.89        | 2.94  |
| O  | 28.67       | 28.67 |
| Cl | 25.41       | 25.41 |

Melting point—begins to melt at 137–140° C. followed by decomposition.

Using similar procedure as in Example I, 3.6 grams of calcium oxide were added to 120 grams of ethyl alcohol which was stirred and refluxed for three hours. 20 grams of 4-hydroxy-3-methoxybenzaldehyde and 23 grams of trichloroacetic acid were added and the mixture was stirred under reflux for two hours.

From the reaction mixture, the product 2-methoxy-4-formaldo phenoxy dichloroacetic acid is readily recovered in good yield. This example, together with the other examples, shows that the substituents on the aromatic ring have little or no effect on the reaction. The particular aryl compound used is not critical, since the reaction will proceed readily at the hydroxy group bonded to the ring.

In carrying out tests of this example, growth inhibition was noted on Czapeks' medium deep pour plates. The medium was made 1:18,000 dilution with 2-methoxy-4-formaldo phenoxy dichloroacetic acid. The following organisms were used and growth was determined at 96 hours at 30° C.:

*Epidemophyton floccosum* _____ No growth
*Blastomyces dermatitidis* _____ Light growth
*Penicillum italicum* _____ No growth
*Cryptococcus neoformans* _____ Light growth
*Streptomyces lavendulae* _____ No growth

EXAMPLE III 3-methyl-5-isopropyl phenoxy dichloroacetic acid

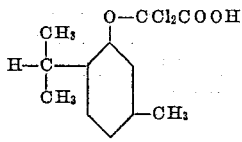

Thymol derivative: C₁₂H₁₄O₃Cl₂; M. W. 276.914.

|    | Theoretical | Found |
|----|-------------|-------|
| C  | 52.00       | 52.14 |
| H  | 5.09        | 5.16  |
| O  | 17.33       | 17.12 |
| Cl | 25.60       | 25.22 |

Boiling point 171–174° C.
Refractive index 1.489.
Specific gravity 1.0498.

Using a similar procedure as in Example I, 3.7 grams of calcium oxide and 120 grams of ethyl alcohol were stirred under reflux for three hours, and 20 grams of thymol and 24 grams of trichloroacetic acid were added and again stirred and refluxed for four hours.

The excess alcohol is driven off and the reaction mixture is then fractioned to obtain 3-methyl-5-isopropyl phenoxy dichloroacetic acid in high yield. The liquid thus recovered is a dark yellow in color. It is not viscous, and has a sweet-smelling, pleasant aroma.

The medium used in proving the effectiveness of this example was dextrose tryptose agar. The medium was made 1:10,000 with 3-methyl, 5-isopropyl phenoxy dichloroacetic acid. The following organisms were used to make pour plates and were incubated at 37° C. for 48 hours:

*Brucella abortus* _____ No growth
*Shigella paradysenteriae* _____ No growth
*Streptococcus pyogenes* _____ No growth
*Bacillus mesentericus* _____ No growth

EXAMPLE IV 2-methoxy phenoxy dichloroacetic acid

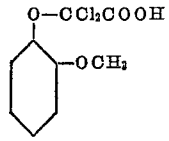

Guaiacol derivative: C₉H₈O₄Cl₂; M. W. 250.978.

|    | Theoretical | Found |
|----|-------------|-------|
| C  | 43.03       | 42.83 |
| H  | 3.21        | 3.13  |
| O  | 25.50       | 25.30 |
| Cl | 28.25       | 28.09 |

Melting point—begins to melt at 137–140° C. followed by decomposition.

Using a similar procedure as in Example I, 4.6 grams of calcium oxide, 20 grams of guaiacol and 28 grams of trichloroacetic acid were used. After driving off the ethyl alcohol, 2-methoxy phenoxy dichloroacetic acid is recovered in good yield.

It is obvious from the above examples that homologous and isomeric compounds may be used successfully in this new reaction. A phenoxy group may be used that contains more than one hydroxyl and alkoxy, as well as more than two alkyl groups. The alkyl substituents, as well as the alkoxyl groups, may either or both contain a greater or lesser number of carbons than is hereby represented. The phenoxy group may contain one or more carboxylic acid groups or its esters or salts. The chlorine in the acetic acid group may be replaced with other halogens. The carboxylic acid of the halo acid may be converted to ester or salt. It is to be understood that changes in molecular structure may or may not alter the effectiveness of the biostatic activity.

The compounds just described have biostatic and biocidal properties which recommend their use in various fields. Their inhibitory effect against the aspergilli, the mucor, the penicillins and other molds, as well as gram negative bacilli and some gram positive bacilli, has been determined. Also, they have been found to inhibit the growth of some of the cocci thermophiles and spore bearers. Their effectiveness is pronounced in dilutions of 1:1000 and is commendable in dilutions of 1:20,000. These compounds may be used in aqueous suspensions and in emulsions, or adsorbed on dry or inert materials or in solution in alcohols, oils, hydrocarbons and other solvents. The form in which they are used will be determined by the nature of their use. They are effective in contact with either protein, carbohydrate or lipoidal materials.

Having thus described the invention, what is claimed as new and desired to be secured by Letters Patent is:

1. A compound having the general formula

ROCCl₂COOH where R is a group selected from the class consisting of phenyl, alkylphenyl, polyalkyl phenyl, alkoxyphenyl, and alkoxy carbonyl phenyl, said alkylphenyl, polyalkyl phenyl, alkoxy phenyl, and alkoxy carbonyl phenyl, having alkyl groups containing not more than four carbon atoms per molecule.

2. As a new composition of matter, phenoxy dichloroacetic acid, $C_6H_5OCCl_2COOH$.

3. As a new composition of matter, 2-methoxy phenoxy dichloroacetic acid, $CH_3OC_6H_4OCCl_2COOH$.

4. As a new composition of matter, 2-methoxy-4-formaldo phenoxy dichloroacetic acid.

5. As a new composition of matter, 5-isopropyl-3-methyl phenoxy dichloroacetic acid.

6. An alkyl substituted phenoxy dichloro aliphatic ether acid in which the total number of alkyl carbon atoms is within the range from one to ten per molecule.

7. The method of preparing aryloxy dihalo aliphatic acids comprising the steps of admixing a trichlorinated aliphatic acid and a compound of the type ROH wherein R is a group selected from the class consisting of phenyl, alkylphenyl, polyalkyl phenyl, alkoxy phenyl, and alkoxy carbonyl phenyl, the total number of alkyl carbon atoms in said compound being within the range from one to ten per molecule, in a medium containing ethanol and calcium oxide, and heating the admixture at a temperature sufficient to reflux the same until the reaction is substantially completed.

8. The method as set forth in claim 7 wherein the poly alkyl phenyl hydroxy compound is thymol.

9. The method as set forth in claim 7 wherein the alkoxy phenyl hydroxy compound is guaiacol.

10. The method as set forth in claim 7 wherein the alkoxy carbonyl phenyl hydroxy compound is 4-hydroxy-3-methoxybenzaldehyde.

11. The method of preparing aryloxy dihalo aliphatic acids comprising the steps of refluxing calcium oxide and ethanol until the reaction product is substantially formed; admixing with the product a trichlorinated aliphatic acid and a compound of the type ROH wherein R is a group selected from the class consisting of phenyl, alkyl phenyl, polyalkyl phenyl, alkoxy phenyl, and alkoxy carbonyl phenyl, the total number of alkyl carbon atoms in said compound being within the range from one to ten per molecule; and heating the admixture at a temperature sufficient to reflux the same until the reaction is substantially completed.

12. A method as set forth in claim 11 wherein said aliphatic acid is trichloroacetic acid.

References Cited in the file of this patent

Beilstein, vol. II, Ind. Supp., p. 199.